United States Patent
Dunton et al.

(10) Patent No.: US 7,060,217 B2
(45) Date of Patent: Jun. 13, 2006

(54) COMPOSITE ARTICLES COMPRISING RESORCINOL ARYLATE POLYESTER AND METHOD FOR MAKING THEREOF

(75) Inventors: Thomas Paul Dunton, Lebanon Springs, NY (US); Craig Lawrence Milne, Pittsfield, MA (US); Randall Todd Myers, Pittsfield, MA (US); Venkatkrishna Raghavendran, Forest, VA (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/807,844

(22) Filed: Mar. 24, 2004

(65) Prior Publication Data

US 2004/0250944 A1 Dec. 16, 2004

Related U.S. Application Data

(60) Provisional application No. 60/477,973, filed on Jun. 12, 2003.

(51) Int. Cl.
- B29C 43/02 (2006.01)
- B29C 43/04 (2006.01)
- B29C 43/18 (2006.01)
- B29C 43/20 (2006.01)
- B29C 43/34 (2006.01)

(52) U.S. Cl. ............... 264/299; 264/266; 264/267; 264/330; 264/337; 264/338; 264/138; 264/319; 264/320; 264/325

(58) Field of Classification Search ............... None
See application file for complete search history.

(56) References Cited

U.S. PATENT DOCUMENTS

| | | | |
|---|---|---|---|
| 4,629,319 A | 12/1986 | Clarke et al. | |
| 4,643,937 A * | 2/1987 | Dickinson et al. | 428/215 |
| 4,804,566 A * | 2/1989 | Paul et al. | 428/35.7 |
| 4,861,630 A * | 8/1989 | Mihalich | 428/34.1 |
| 4,983,247 A * | 1/1991 | Kim | 156/272.2 |
| 5,001,000 A | 3/1991 | Rohrbacher et al. | |
| 5,055,531 A * | 10/1991 | Fox et al. | 525/439 |
| 5,601,679 A | 2/1997 | Mulcahy et al. | |
| 5,811,039 A * | 9/1998 | Addeo et al. | 264/46.4 |
| 6,136,441 A * | 10/2000 | MacGregor et al. | 428/412 |
| 6,143,839 A * | 11/2000 | Webb et al. | 525/439 |
| 6,265,522 B1 * | 7/2001 | Brunelle et al. | 528/194 |
| 6,291,589 B1 * | 9/2001 | Brunelle et al. | 525/165 |
| 6,294,647 B1 * | 9/2001 | Brunelle et al. | 528/486 |
| 6,306,507 B1 * | 10/2001 | Brunelle et al. | 428/423.7 |
| 6,410,620 B1 * | 6/2002 | Shakhnovich | 524/89 |
| 6,497,775 B1 * | 12/2002 | Visconti | 156/73.1 |

(Continued)

FOREIGN PATENT DOCUMENTS

EP 1 316 419 A2 6/2003

(Continued)

OTHER PUBLICATIONS

RD 440066 A (Dec. 10, 2000).*

(Continued)

*Primary Examiner*—Vivian Chen

(57) ABSTRACT

A shaped composite article is prepared by a process wherein an aesthetic laminate having a clear outer arylate layer and a colored compatible resin layer is thermoformed into a desired shape, and then compression molded together with a reinforced resin material containing compatible resin to form a color composite of the desired shape having an outer layer of clear arylate polyester polymer with the compatible resin layer forming an adherent bond with the compatible resin in the resin reinforced material.

12 Claims, 5 Drawing Sheets

U.S. PATENT DOCUMENTS

| | | | |
|---|---|---|---|
| 6,508,967 B1 * | 1/2003 | Visconti et al. | 264/138 |
| 6,538,065 B1 * | 3/2003 | Suriano et al. | 525/182 |
| 6,558,146 B1 * | 5/2003 | Shah et al. | 425/113 |
| 6,596,843 B1 * | 7/2003 | Brunelle et al. | 528/486 |
| 6,607,814 B1 * | 8/2003 | Pickett et al. | 428/212 |
| 6,610,409 B1 * | 8/2003 | Pickett et al. | 428/423.7 |
| 6,627,303 B1 * | 9/2003 | Gallucci et al. | 428/212 |
| 6,689,474 B1 * | 2/2004 | Pickett et al. | 428/423.7 |
| 6,838,027 B1 * | 1/2005 | Brodi et al. | 264/138 |
| 6,861,482 B1 * | 3/2005 | Brunelle et al. | 525/439 |
| 6,887,573 B1 * | 5/2005 | Vollenberg et al. | 428/412 |
| 2001/0028131 A1 * | 10/2001 | Brodi et al. | 264/255 |
| 2002/0039657 A1 * | 4/2002 | Brunelle et al. | 428/423.7 |
| 2003/0175488 A1 | 9/2003 | Asthana et al. | |
| 2003/0207123 A1 * | 11/2003 | Brunelle et al. | 428/423.7 |
| 2004/0043683 A1 * | 3/2004 | Muench | 442/43 |

FOREIGN PATENT DOCUMENTS

| | | |
|---|---|---|
| EP | 1124878 | 1/2004 |
| WO | WO 00/61664 | 10/2000 |
| WO | WO 00/69945 | 11/2000 |
| WO | WO 02/094560 A2 * | 11/2002 |
| WO | WO 03/047857 A1 | 6/2003 |
| WO | WO 2004/065122 A1 | 8/2004 |

OTHER PUBLICATIONS

RD 440055 A (Dec. 10, 2000).*

International Search Report for PCT/US2004/014912 Mailing Date Oct. 4, 2004; 3 pages.

Elizabeth Brister et al. Zero Voc Sollx™ Film for Weatherable, High-Gloss, Chemical and Scratch Resistant Performance. Presented at the *International Waterborne, High-Solids and Powder Coatings Symposium*, Feb. 6-8, 2002. pp. 261-277.

Daimler Chrysler Corporation Appearance Standard No.: AS-10169; Surface Appearance Requirements for Fascias and Exterior Components. Date Issued Feb. 10, 1999; pp. 1-9.

"Plug Surface Preparation and Mold Surface Maintenance"; http://www.fibreglast.com/ . pp. 1-3.

David Vink "Film backmoulded composites offer automotive panels with Class A surface finish"; Plastics & Rubber Weekly; http://www.prw.com/main.newsdetails. Jul. 7, 2005, p. 1.

"Customer Successes" John Deere Horicon Works; COE Press Equipment Corporation; http://www.cpec.com/Success-JohnDeere.htm; pp. 1-4.

* cited by examiner

COMPOSITE ARTICLES COMPRISING RESORCINOL ARYLATE POLYESTER AND METHOD FOR MAKING THEREOF

CROSS REFERENCE TO RELATED APPLICATIONS

This application claims priority to U.S. Provisional Application Ser. No. 60/477,973 filed on Jun. 12, 2003, which is incorporated herein by reference in its entirety.

FIELD OF THE INVENTION

This invention relates to reinforced resinous articles having a coating layer comprising a resorcinol arylate polyester, and a method for preparation the composite articles.

BACKGROUND OF THE INVENTION

Compositions and weatherable multilayer articles comprising resorcinol arylate chain members are known. See Published patent application Nos. EP 1124878 and WO 00/69945, pages 27–30, describes multilayered articles in the following manner: "The multilayer articles typically have outstanding initial gloss, improved initial color, weatherability, impact strength, and resistance to organic solvents encountered in their final applications." Page 27, paragraph 2, states: "The material of the substrate layer in the articles of this invention may be at least one thermoplastic polymer, whether addition or condensation prepared. Condensation polymers include, but are not limited to, polycarbonates, particularly aromatic polycarbonates, polyphenylene ethers, polyetherimides, polyesters ****." The second paragraph on page 29, states: "Multilayer articles encompassed by the invention also include those comprising at least one glass layer. Typically any glass layer is a substrate layer, although multilayer articles comprising a thermally stable polymer coating layer interposed between a glass layer and a substrate layer are also contemplated. Depending upon the nature of the coating and glass layers, at least one adhesive interlayer may be beneficially employed between any glass layer and any thermally stable polymer coating layer. The adhesive interlayer may be transparent, opaque or translucent. For many applications it is preferred that the interlayer be optically transparent in nature and generally have a transmission of greater than about 60% and a haze value less than about 3% with no objectionable color."

U.S. Pat. No. 4,983,247 to Bang et al describes a compression molding process for forming a fiber free layer adjacent a composite bulk layer where a resin layer and the bulk layer are compressed in a an insulated mold so that the heat of the bulk layer heats the fiber free layer until it is molten while the layers are being compressed.

The prior art refers manufacture multilayer articles and attaching or coating substrate layer, typically by adhesion using a tie layer.

SUMMARY OF THE INVENTION

In a process for forming a shaped composite article, a laminate is thermoformed into a desired shape. The laminate comprises a layer of an arylate polyester polymer adhered to a layer of a compatible resin. In an embodiment, the arylate layer is clear and the compatible resin layer includes a colorant. The shaped laminate is compression molded together with a material comprising compatible resin and a reinforcing material to form a composite of the desired shape having an outer layer of arylate polyester polymer. An adherent bond is formed between the compatible resin contained in the reinforcing material and the arylate laminate. In an embodiment, the compatible resin in the laminate is a polycarbonate. In an embodiment, the compatible resin in the reinforcing material is a polycarbonate resin. In an embodiment, the compression-molded article comprises a weatherable resorcinol arylate having a high gloss and hardness to provide a class "A" finish for use in automotive parts. In another embodiment, compatible resin in both the laminate and the reinforced resin, respectively, form and adherent interface for the final article. The resulting compression molded shaped article comprises a laminate adhered to a reinforced resin material. The final article desirable has a vertical peel strength in lb/in of greater than 5, preferable greater than 10, and more preferable greater than 15.

DESCRIPTION OF THE INVENTION

Thermoformable Laminate

Figure 1:
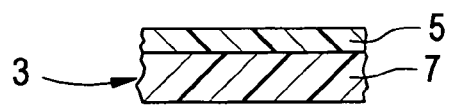
FIG. 1 is a are schematic section view illustrating an example of an aesthetic laminate.

As illustrated in FIG. 1, a thermoformable laminate 3 comprises a arylate polyester layer 5 adhered to a compatible resin layer 7. In an embodiment, the arylate polyester resin is clear and comprises a resorcinol arylate polyester chain members. The polyester arylate imparts desirable properties of weatherability, and UV resistance. The arylate polyester chain members desirable comprise at least one diphenol residue in combination with at least one dicarboxylic acid residue. A compatible resin layer 7 of a compatible resin comprises a resin that is selected to adhere to the arylate polyester polymer layer 5. Typical compatible resin materials comprise polycarbonate, polyester, polyetherimide, polyamide, polyacrylonitrile containing resin such as an ABS resin, acrylic-styrene-acylonitrile (ASA), acrylonitrile ethylene-polypropylene diamine modified styrene (AES), phenylene sulfide, polymethyl methacrylate (PMMA), copolyester carbonates, poly(alkylene dicarboxylates). Preferable the compatible resin layer 7comprises a polyester or polycarbonate, preferably an aromatic polycarbonate, in an amount to enhance the adherence of the compatible resin layer 7 to the arylate polyester layer 5. The thermoformable laminate 3 may be constructed by various processing techniques such as extrusion, co-extrusion, casting, coating, vacuum deposition, lamination, molding, and combinations thereof. The thermoformable laminate preferably has a thickness from about 15 to about 60 mils, more preferable from about 30 to about 50 mils.

Thermoforming

The aesthetic laminate 3 is thermoformed into a shape substantially corresponding to the shape of the desired final article. Typically, thermoforming comprises the simultaneously heating and forming a laminate 3 in the form of a film, into the desired shape. Once the desired shape has been obtained, the formed article is cooled below its thermoplastic temperature and removed from the mold. Thermoforming methods and tools are described in detail in DuBois and Pribble's "Plastics Mold Engineering Handbook", Fifth Edition, 1995, pages 468 to 498. Thermoforming methods may also be utilized as set forth in U.S. Pat. No. 5,601,679 to Mulcahy et al.

Figure 2:
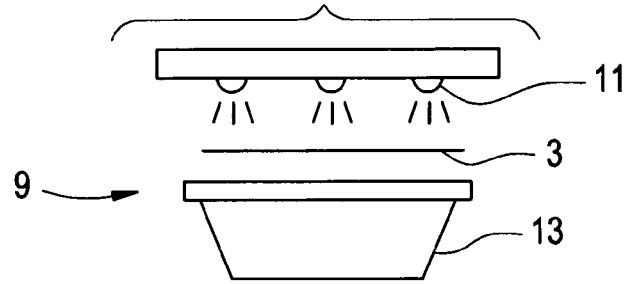
FIG. 2 is a schematic view illustrating of a method of manufacturing a thermoformed laminate.
Figure 3:
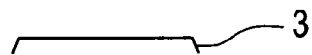
FIG. 3 shows a thermoformed aesthetic laminate.

FIG. 2 illustrates a thermoforming apparatus. The thermoforming apparatus 9 included radiant heaters 11 and the mold body or mold form 13 which include a vacuum assist (not shown). Typically, the laminate 3, in the form of a film, is formed with the assistance of a vacuum with the vacuum former and surrounding metal framework preheated to minimize chill of the laminate. The laminate 3 is placed on a vacuum box or mold form 13 which may have openings connected to a source of a vacuum.

Preferable, the laminate 3 is mounted with the compatible resin layer 7 adjacent the surface of the mold form 13 to obtain a smooth surface on the arylate polyester layer 5. Clamp frames may be activated for mechanically holding the sheet in place. A suitable heat shield, such as a aluminum foil, may be utilized for avoiding heating the surface at selected locations such as other than a sink portion. The sheet is then exposed to the thermo-forming ovens. Top and bottom heaters may be used. The laminate 3 is heated and moved to the mold. The laminate 3 is drawn into the mold during the forming operation. To obtain a good surface finish, the openings for drawing the vacuum are preferably spaced away from an area of the part requiring an optimized surface finish. The vacuum openings may be conveniently located around the periphery of the mold form so that the esthetic areas of the laminate 3 are in contact with a smooth mold surface. Areas of the part adjacent vacuum openings, which may have some surface flaws or imperfections, may be trimmed by a laser trimmer to obtain a final part free of surface imperfections. It is contemplated that porous metal molds may also be used. According to an embodiment, the laminate 3, is preferably placed over a concave mold and heated, such as by an infra-red heater 11. Vacuum is applied to draw the laminate 3 into place against the mold form 13. The process may be modified combining a positive air pressure on the top of the laminate with vacuum from the underside to increase the molding force.

Resin Material Containing Reinforcing

Figure 4:
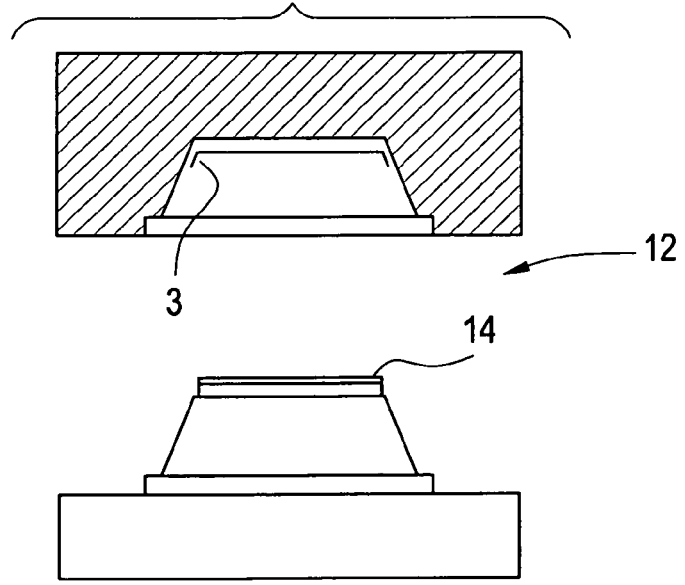
FIG. 4 is a schematic view illustrating compression molding of the laminate with the fibrous resin material.

Referring to FIG. 4, reinforced resin material 14, which includes reinforcing and compatible resin, is compression molded to the thermoformed laminate 3 to form the final article in the desired shape. The reinforced resin material 14 includes a resin compatible with the adjacent compatible resin layer 7 and selected to form an adherent bond therewith. A final composite comprising the thermoformed laminate 3 and the reinforced resin material 14 has the desired final shape with an outer layer of the arylate polyester polymer for weather resistance and a color corresponding to colorant in the compatible resin layer 7. In the final article, an adherent bond is formed between the compatible resin layer 7 and the arylate polyester layer 5 on one side, and the reinforcing resin material 14 on the other side. In addition to compatibility, the reinforcing resin material 14 is selected impart a desirable stiffness to the final article. The compatible resin included in the reinforcing resin material 14 is as hereinbefore described with respect to the compatible thermoplastic compatible resin layer 7. According to an embodiment, the reinforced resin material 14 comprises fibers. Typical fibers include glass, carbon, ceramic, and resin materials. Preferably the fibers utilized are from 0.25 to 1.5 inch, preferably in the range of about 0.5 to about 0.75 inch and are randomly oriented in a matrix of compatible resin. It is contemplated that longer fibers may be utilized provided such longer fibers do not compromise the desirable aesthetic surface finish. It is also contemplated that discontinuous or continuous fibers may be utilized. Discontinuous or discrete fibers may be randomly or orderly oriented. Continuous fibers would typically be arranged in an oriented orderly manner. The reinforced resin material 14 may comprise a 15–55% glass fiber mat and 45–85% polymer resin. The use of glass fiber is preferable. Preferably glass or other fibers have a sizing which is compatible with the compatible resin. According to an embodiment, a substantially completely densified mat comprises 30 percent by weight glass fiber having a nominal diameter of about 16 microns and chopped to a length of about 0.5 inch with the remaining portion by weight being polycarbonate resin.

The process employed in the practice of this invention is capable of using other natural or synthetic fibers such as polyethylene terephthate fibers, polyamide fibers, carbon fibers, etc. Also, various amorphous or crystalline thermoplastic resins may be employed such a polyesters (PET, PBT, PPT), acrylics, polyethylene (PET), polycarbonate (PC) or blends of PC/PBT or PC/PET and the like thermoplastics polymers as previously discussed with respect to the compatible resin without modification of the web forming process. In this process the ratio of fibers to polymers, as well as the basic weight of the web may be varied in order to meet individual requirements of cost/performance and stiffness.

Known techniques may be used for the production of reinforced resin material 14. One process used to produce a densified mat of fibers, deposits discrete fibers onto and between layers of thermoplastic films or sheet. The resulting layered material is passed through the a pair of opposing hot rollers to melt the thermoplastic resin, compress, and densify the material into a fiber laminated mat. Such mats of material are available from Azdel Inc. as GMAT. For GMAT mat, which is continuous, a festooner is used to raster the mat in a box, alternately, the mat can also be wound on rolls. Random continuous mats and random continuous and unidirectional mats may be produced with this technique. According to another technique, a web of fibers may be produced according to a technique known in the art as Wiggins Teape process. Sheets of this type, comprising a reinforced resin sheet are available from Azdel, Inc. Other process may use an air laid process for laying the web and then needle punches it to form a mat. The air process may be utilized to produce a mat of random discrete fibers and thermoplastic powder. To produce a mat according to the Wiggins Teape process, the materials including other additive are metered and dispersed into the mixing tank fitted with an impeller. Glass fibers and thermoplastic resin binder are dispersed. The mixture of glass and thermoplastics binder is pumped to a head-box via a distribution manifold. The head box is located above a wire section of a machine of the type utilized for papermaking. The dispersed mixture passes through a moving wire screen using a vacuum, continuously producing a uniform, fibrous wet web. The wet web is passed through a dryer to reduce moisture content. The web is heated to melt the thermoplastic resin binder and the mat is passed through the gap in an opposing pair of rollers to form the mat. FIG. 4 shows a reinforced resin material 14 positioned in a compression mold 12. For enhanced structural strength mats are preferable densified. The mats utilized preferable have a high strength-to-weight ratio, high impact properties, good chemical resistance, and may be economically produced.

Figure 5:
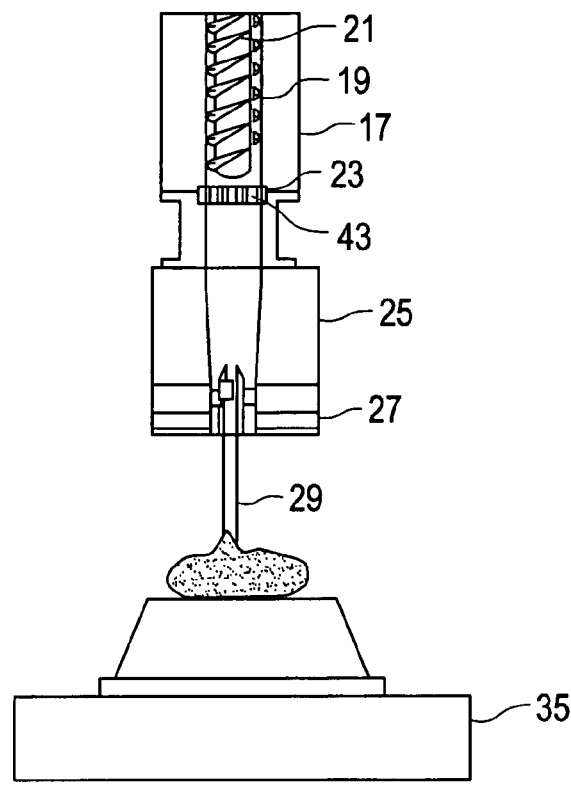
FIG. 5 is a schematic view of resin containing reinforcing material being deposited in a compression mold.

According to an embodiment illustrated in FIG. 5, fibers, preferably coated, chopped glass strands, are mixed with the compatible resin, preferably aromatic polycarbonate resin or polyester resin, or mixtures thereof, and then fed to an extruder and the extrudate utilized to form a compression molded layer of compression molded reinforcing material. Dispersed glass fibers are reduced in length as a result of the shearing action on the chopped glass strands in the extruder barrel. The amount of glass present in the composition can range anywhere from 5 to about 60 weight percent based on the total weight of the thermoplastic blend composition, preferably from 10 to 30 percent by weight thereof.

Figure 6:
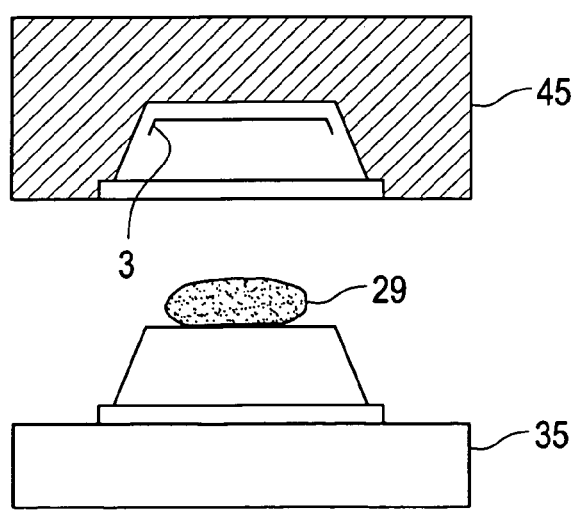
FIG. 6 is a schematic view of resin containing reinforcing material being compression molded.

FIG. 6 shows extruder 15. The extruder 15 has a housing 17 with a central barrel shape opening 19 with a helical screw 21 mounted for rotation about an axis. At one end of the opening, a hopper (not shown) is utilized for feeding material to be extruded into the rear portion of the screw 21. Helical threads mounted on the screw 21 are positioned for moving material from the rear portion of the screw to a forward portion through the opening 19. As the material or feedstock is conveyed along the screw 21, frictional forces caused by rotation of the screw 21 heats it. It is also contemplated that an external heating source such as an electrical resistant heater may be provided to heat the extruder 15, which in turn heats the feedstock. The housing 17 or the screw 21 are parts of the extruder, which may heat. At the forward end of the housing 17 and spaced from the forward end of the screw 21, a breaker plate 23 is mounted transverse to the flow of feedstock. The breaker plate 23, includes a plurality of openings 43 for the passage of feedstock, acts to create a backpressure, which contributes to the mixing and heating of the feedstock and also serves to filter impurities from the feedstock.

A die body 25 is mounted on the forward end of the housing 17. The mounting is conventionally made by bolting or clamping a flange on the die body 25 to a flange on the housing 17. As illustrated in FIG. 5, the die body 25 includes a tapered central and axially aligned opening which throttles the feedstock. At the die outlet, a die plate 27, has an opening with the desired cross sectional shape of the profile to be extruded. As illustrated in FIG. 6, the extrudate 29 in tubular form is deposited on the lower section 35 of the compression mold 12. According one embodiment, a pair of extruders is utilized with pellets of the compatible resin being softened in the first extruder with the extrudate from the first extruder being fed to a second extruder for the addition of fibers.

Compression Molding

The compression molding of the thermoformed laminate 3 to the reinforced resin material 14 (illustrated in FIG. 4), or to the extrudate 29 (illustrated in FIG. 6), is carried out to form a structural bond between the laminate and the resin material. Preferably, a bond is formed with the molecules of the thermoplastic compatible resin layer 7 co-mingled with the molecules of the reinforced resin material 14 such as by diffusion to form an interface and an integral thermoplastic structure. The thermoformed laminate 3 is trimmed into at least the rough shape of the final article. The trimmed shape is then registered with, or placed into, the upper cavity of the compression tool with the aesthetic side, or araylate resin side, against or in proximity to the upper cavity tool surface.

The reinforced resin material 14 is heated to a softening temperature, typically, from about 500 to about 700° F. The resin in heated form is placed adjacent the bottom surface of the compression mold 12. If a balanced structure is desired, i.e. both top and bottom surfaces of the final part having a thermoplastic layer, an additional thermoplastic compatible resin layer 7 may be placed adjacent the bottom mold surface. The purpose of the balanced structure is to obtain a layer opposite the aesthetic side that matches the coefficients of thermal expansion of the top layer. The balancing layer may be of a compatible resin. Placing the laminate 3 in the upper tool cavity permits enhanced temperature control of the laminate 3 since it is remote from the hot reinforced resin material 14 in FIG. 4. Heat from the reinforced material 14 may be utilized to heat and soften the compatible resin layer 7. The mold is closed to the point where resin flows from the reinforced resin material 14 to form a molecular bond with the compatible resin layer 7 in the laminate 3. Desirably, the reinforced resin material 14 heated to the softening point and the molding process is halted before the arylate polyester layer 5 becomes too viscous. Temperatures of the top section 45 of the mold typically are desirable from about 100 to about 270 degrees F. Such temperatures may be maintained by cooling. It is desirable that the Class A surface be retained to minimizes glass read through and other surface imperfections. Preferably the interface includes compatible resin from both the laminate 3 and the reinforced resin material 14. The mold is opened and the structural part is removed. Molds are typically made from a metal having high thermal conductivity such as aluminum.

After laminate 3 is formed, and placed in or registered with the upper mold cavity as shown in FIG. 6, the extrudate 29 is placed between the mold halves. The extrudate 29 is or has been previously heated to its softening temperature. The laminate 3 containing arylate resin, as shown in FIG. 6, is registered in the top half of the compression mold at or below its softening temperature. The mold cores 35 and 45 are then closed to compress the laminate 3 against the extrudate 29. The heat from the extrudate 29 flows towards laminate 3 and causes exterior portion of the laminate 3 containing compatible resin layer 7 to form a molecular bond with the molten sheet of extrudate 29. The interface formed with laminate 3 forms a resulting integral structural bond at the junction between the laminate 3 and the extrudate 29. A strong bond bonds the arylate laminate 3 to the extrudate 29.

Figure 7:
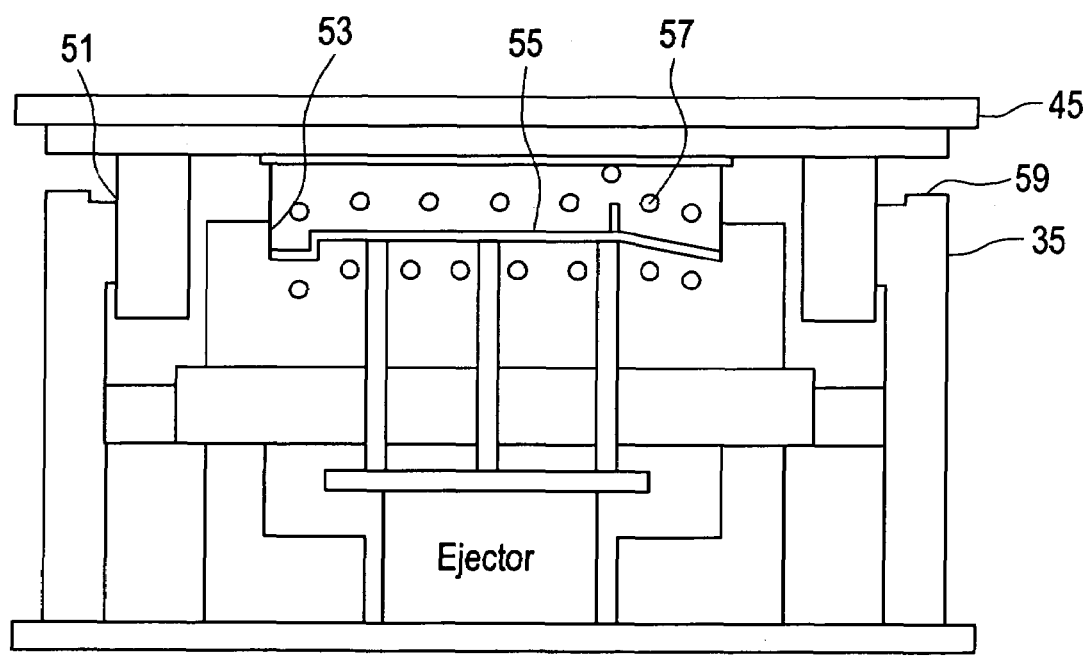
FIG. 7 is a schematic view of a compression molded.

Some of preferred features of a compression mold 12 having a top half 45 and bottom half 35 are illustrated in FIG. 7. Registry between the top and bottom mold sections, 45 and 35, are shown at 51 where mating surfaces provide guidance and alignment during opening and closure of the compression mold 12. The laminate 3 is registered in the part cavity 55, which includes a shear edge 53 that aids in the retention of material in the part cavity during compression. Temperature openings 57 are utilized to cool or maintain the top section at a proper temperature so that the arylate polyester layer 5 retains a Class A finish. Oil typically is used as a coolant. It is desirable to independently control the temperature of the top and bottom mold sections. An ejector is also shown for ejecting the completed part form the mold.

Detail on Arylate Layer

Suitable dicarboxylic acid residues include aromatic dicarboxylic acid residues derived from monocyclic moieties, preferably isophthalic acid, terephthalic acid, or mixtures of isophthalic and terephthalic acids, or from polycyclic moieties, including diphenyl dicarboxylic acid, diphenylether dicarboxylic acid, naphthalenedicarboxylic acid such as naphthalene-2,6-dicarboxylic acid. In one embodiment, the dicarboxylic acid is 1,4-cyclohexanedicarboxylic acid.

In one embodiment, the diphenol residue is derived from a 1,3-dihydroxybenzene moiety, as illustrated in Formula 1, commonly referred to as resorcinol or resorcinol moiety.

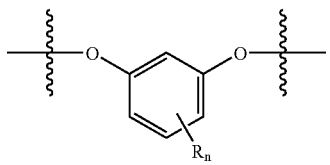

In Formula I, R is at least one of $C_{1-12}$ alkyl or halogen, and n is 0–3. Examples of Resorcinol or resorcinol moiety includes both unsubstituted 1,3-dihydroxybenzene and substituted 1,3-dihydroxybenzenes.

In one embodiment, the aromatic dicarboxylic acid residues are derived from mixtures of isophthalic and/or terephthalic acids (ITR) as typically illustrated in Formula II.

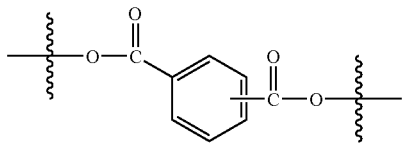

In one embodiment of the laminated structure, the outer layer or the coating layer comprises resorcinol arylate polyester chain members as illustrated in Formula III wherein R and n are as previously defined:

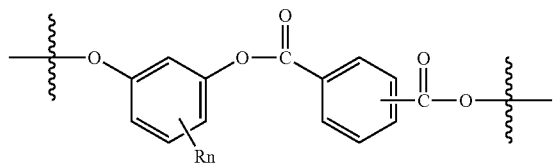

In one embodiment, the arylate polyester layer is an outer layer and a blend of polymers comprising resorcinol arylate polyester chain members and at least one other polymer selected from at least one of miscible, immiscible, and compatibilized blends including but not limited to: polycarbonates, polyesters, polyetherimides, polyphenylene ethers, PC/ABS, PC/ASA, PC/PBT, PC/PET, PC/polyetherimide, polyamide, polyester/polyetherimide, polyphenylene ether/polystyrene, polyphenylene ether/polyamide, polyphenylene ether/polyester, blends, regrinds and foams of any of the above. In another embodiment, the outer layer is comprised of a block copolyestercarbonate comprising resorcinol arylate-containing block segments in combination with organic carbonate block segments as disclosed in Patent Application EP 1124878.

In one embodiment of applications wherein high levels of scratch and/or chemical resistance are required, the amount of resorcinol arylate-containing block segments is in the range of about 50 to 100 mole %.

The compatible resin comprises a resin that is selected to adhere to the arylate polyester polymer layer and when present in the reinforcing resin material forms an adherent bond with the thermoplastic resin layer of the laminate. Preferably, the compatible resin is as previously described with respect to the compatible resin of the laminate. Preferably, a polycarbonate, a polyester, or polyether imide as previously described.

Detail on Embodiment with a Polycarbonate Layer

Preferable the compatible resin layer 7 comprises polycarbonate in an amount to enhance the adherence of the compatible resin layer 7 to both the arylate polyester layer 5 and to the fibrous resin layer. In another embodiment, the compatible resin layer 7 is a polycarbonate. By the term polycarbonate is meant carbonate polymers possessing recurring structural units of the formula:

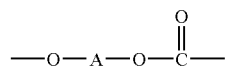

wherein A is a divalent aromatic radical of the dihydric phenol employed in the polymer reaction. Suitable aromatic polycarbonate resins include linear aromatic polycarbonate resins and branched aromatic polycarbonate resins. Suitable linear aromatic polycarbonates resins include, for example, bisphenol A polycarbonate resin. Suitable branched polycarbonates are known and are made in various embodiments by reacting a polyfunctional aromatic compound with a dihydric phenol and a carbonate precursor to form a branched polymer.

The dihydric phenol which may be employed to provide such aromatic carbonate polymers are mononuclear or polynuclear aromatic compounds, containing as functional groups two hydroxy radicals, each of which maybe attached directly to a carbon atom of an aromatic nucleus. Typical dihydric phenols are: 2,2-bis(4-hydroxyphenyl) propane; hydroquinone; resorcinol; 2,2-bis(4-hydroxyphenyl) pentane; 2,4'-(dihydroxydiphenyl) methane; bis(2-hydroxyphenyl) methane; bis(4-hydroxyphenyl) methane; 1,1-bis(4-hydroxyphenyl)-3,3,5-trimethylcyclohexane; fluorenone bisphenol, 1,1-bis(4-hydroxyphenyl) ethane; 3,3-bis(4-hydroxyphenyl) pentane; 2,2'-dihydroxydiphenyl; 2,6-dihydroxynaphthalene; bis(4-hydroxydiphenyl)sulfone; bis(3,5-diethyl-4-hydroxyphenyl)sulfone; 2,2-bis(3,5-dibromo-4-hydroxyphenyl)propane; 2,2-bis(3,5-dimethy-4-hydroxyphenyl)propane; 2,4'-dihydroxydiphenyl sulfone; 5'-chloro-2,4'-dihydroxydiphenyl sulfone; 4,4'-dihydroxydiphenyl ether; 4,4'-dihydroxy-3,3'-dichlorodiphenyl ether, spiro biindane bis phenol, and the like.

It is contemplated that the compatible resin layer 7 may include polyester resins such as a thermoplastic polyester. Examples of thermoplastic polyester include but not limited to poly(alkylene dicarboxylates), poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly(butylene naphthalate) (hereinafter sometimes designated "PBN"), poly (cyclohexanedimethanol terephthalate), poly (cyclohexanedimethanol-co-ethylene terephthalate) (hereinafter sometimes designated "PETA"), and poly(1,4-cyclohexanedimethyl-1,4-cyclohexanedicarboxylate) (hereinafter sometimes designated "PCCD"), poly(alkylene arenedioates), and polyesters available from renewable agricultural or other resources, such as vegetable or animal material, biomass, i.e., formed of polylactic acid.

Colorants for Compatible Resin Layer

In one embodiment, the compatible resin layer 7 comprises polycarbonate resin (as a color and adhesive layer) having compatibility to both the arylate polyester layer 5 and to the fibrous resin layer for enhancing adherence between the layers. The thickness of the multilayer article comprising a polycarbonate substrate layer and the arylate layer is chosen to be sufficient to cover minor surface blemishes fibrous material resulting in a durable, high grade, even class "A" finish required for automotive applications.

The compatible resin layer 7, sometimes referred to as a substrate, desirable includes a colorant which enhances a visual effect. Such additives typically known for inclusion in films and sheets, including pigments, decorative material such as metal flakes, dyes, and luminescent compounds. Conventional pigments include metallic oxides such as titanium dioxide, and iron oxide; metal hydroxides; metal flakes such as aluminum flake; chromates such as lead chromate; sulfides; sulfates; carbonates; carbon black; silica; talc; china clay; phthalocyanine blues and greens, organo reds; organo maroons and other organic pigments and dyes.

In a preferred embodiment, pigments that are stable at high temperatures are used, i.e., colorants that do not substantially degrade or altered at temperatures at or about 350° C. Examples include Solvent Yellow 93, Solvent Yellow 163, Solvent Yellow 114/Disperse Yellow 54, Solvent Violet 36, Solvent Violet 13, Solvent Red 195, Solvent Red 179, Solvent Red 135, Solvent Orange 60, Solvent Green 3, Solvent Blue 97, Solvent Blue 104, Solvent Blue 104, Solvent Blue 101, Macrolex Yellow E2R, Disperse Yellow 201, Disperse Red 60, Diaresin Red K, Colorplast Red LB, Pigment Yellow 183, Pigment Yellow 138, Pigment Yellow 110, Pigment Violet 29, Pigment Red 209, Pigment Red 209, Pigment Red 202, Pigment Red 178, Pigment Red 149, Pigment Red 122, Pigment Orange 68, Pigment Green 7, Pigment Green 36, Pigment Blue 60, Pigment Blue 15:4, Pigment Blue 15:3, Pigment Yellow 53, Pigment Yellow 184, Pigment Yellow 119, Pigment White 6, Pigment Red 101, Pigment Green 50, Pigment Green 17, Pigment Brown 24, Pigment Blue 29, Pigment Blue 28, Pigment Black 7, Lead Molybdates, Lead Chromates, Cerium Sulfides, Cadmium Sulfoselenide, and Cadmium Sulfide.

In one embodiment of the invention, the amount of colorants used in the substrate layer may be up to 5 wt. % for opacity. In another embodiment of the invention, a combination of colorants are used with some of the colorant being added at low levels for use as a toner. In a third embodiment, Solvent Yellow 163 is used in an amount of about 0.35% to provide a yellow colored substrate.

In another embodiment, in addition to the conventional pigments and colorants in the art, the compatible resin layer 7 further comprises at least a light fastness compound, a light fastness antioxidant, and a light fastness ozonant. Examples of light fastness compounds include didodecyl-3, 3'-thio dipropionate, tris(4-tertbutyl-3-hydroxy-2,6-dimethyl benzyl) isocyanurate, 1,3,5-trimethyl-2,4,6-tris(3,5-di-tert-butyl-4-hydroxybenzyl) benzene, N,N'-.beta.,.beta.'-naphthalene-4-phenylene diamine, or 4,4'-methylene-bis (dibutyl dithio-carbamate), (6) 2,2,4-trimethyl-1,2-hydroquinoline. Examples of light fastness antioxidant include but not limited to: didodecyl-3,3'-thio dipropionate, tris(4-tert-butyl-3-hydroxy-2,6-dimethyl benzyl) isocyanurate, 1,3,5-trimethyl-2,4,6-tris(3,5-di-tert-butyl-4-hydroxybenzyl) benzene, N,N'-.beta.,.beta.'-naphthalene-4-phenylene diamine, 4,4'-methylene-bis(dibutyl dithiocarbamate), 2,2,4-trimethyl-1,2-hydroquinoline. Examples of lightfast antiozonant compounds are N,N'-bis(1,4-dimethyl pentyl)-4-phenylene diamine, 2,4,6-tris-(N-1,4-dimethylpentyl-4-phenylene diamino)-1,3,5-triazine, 6-ethoxy-1,2-dihydro-2,2,4-trimethyl quinoline, bis-(1,2,3,6-tetrahydrobenzaldehyde) pentaerythritol acetal, and the like.

Other Additives to PC

Other conventional additives which may be included in the compatible layer include impact modifiers, UV screeners, flame retardants, fillers, stabilizers, flow aids, ester interchange inhibitors, adhesion promoting agents such as a bisphenol derivative, an aminosilane or derivatives, and mold release agents. Examples of ultraviolet light absorbers (UVA) include benzotriazole, benzophenone, triazine, cyanoacrylate, dibenzoylresorcinol, benzoxazinone and oxanilide based UVA. In addition to UV absorbers, hindered amine light stabilizers (HALS) can also be used. Illustrative ultraviolet radiation absorbing compounds include 2-(benzotriazol-2-yl)-4-(1,1,3,3-tetramethylbutyl)phenol, 2-(benzotriazol-2-yl)-4-methylphenol, 2-hydroxy-4-octyloxy benzophenone, 2-hydroxy-4-methoxybenzophenone, ethyl-2,2-diphenyl-1-cyanoacrylate, 2'-ethylhexyl-2,2-diphenyl-1-cyanoacrylate, 2-(2'-hydroxy-4'-octyloxy) bis-4,6-(2',4'-dimethylphenyl) triazine, 2-ethyl-2'-ethoxy oxalamide, bis [2-hydroxy-5-methyl-3-(benzotriazol-2-yl) phenyl]-methane, bis[2-hydroxy-5-t-octyl-3-(benzotriazol-2-yl) phenyl] methane, 2,2'-(1,4-phenylene) bis [4H-3,1-benzoxazin-4-one], and 2-(2'-hydroxy-4-hexyloxy)-4,6-diphenyltriazine.

The arylate polyester layer 5 may be produced as a separate layer, followed by application to a second layer of the laminate. It can also be produced by simultaneous productions of the layers in a production process. The arylate polyester layer 5 may be produced and employed in such methods but not limited to molding, extrusion, co-injection molding, co-extrusion, overmolding, coating, and the placement of the layer onto the surface of a second layer.

In one embodiment, the arylate polyester layer 5 is has a thickness of about 5 to about 20 mils, and the compatible resin layer 7 about 10 to about 55 mils. In another embodiment, the combined layers of the laminate 3 have a thickness of about 15 to about 60 mils. The compression molded layer of reinforced resin material 14 has a thickness from about 50 to about 1000 mils, preferably from about 75 to about 250 mils (1 mil is $\frac{1}{1000}$ inch).

In applications wherein the laminate 3 is in the form of a film, the compatible layer 7, or substrate layer, helps serve as a reinforcement to facilitate the handling of the arylate polyester layer 5 which may have relatively little inherent tensile strength. In other applications, the substrate layer may incorporate color pigments, metal flakes, etc. to provide special color effects to the arylate polyester layer 7 containing resorcinol arylate polyester chain members, which may be clear/colorless.

The layer of compatible adherent resin ensures both a good adhesion of the coating layer comprising resorcinol arylate polyester chain members and fibrous resin containing material to which the laminate or the multilayer article previously described is adhered. In one embodiment, the compatible adherent resin layer contains a blend of the materials constituting the arylate polyester layer and the compatible resin contained in the resin substrate.

In one example, the compatible resin layer is a blend containing about 10 to 50% PBT and 50 to 90% a resin comprising of resorcinol arylate units. In another example, a compatible blend of a PET and a resin comprising of resorcinol arylate units, containing about 10 to 50% PET and 50 to 90% of a resin comprising resorcinol arylate units. In yet another example, the blend is PETG and a resin comprising resorcinol arylate units, with about 10 to 50% PETG and 50 to 90% a resin comprising resorcinol arylate units. In another embodiment, a compatible blend of a PCT and a resin comprising resorcinol arylate units, with about 10 to 50% PCT and 50 to 90% a resin comprising of resorcinol arylate units. In an embodiment a compatible blend of a PCTA and a resin comprising resorcinol arylate units, the blend contains about 10 to 50% PCTA and 50 to 90% a resin comprising of resorcinol arylate units. In one embodiment of a compatible blend of a PCTG and a resin comprising resorcinol arylate units, the blend contains about 10 to 50% PCTG and 50 to 90% a resin comprising of resorcinol arylate units.

In one embodiment of a compatible resin layer 7, containing a tie-layer is a transparent blend of a poly(1,4-cyclohexanedimethyl-1,4-cyclohexanedicarboxylate) ("PCCD") and polycarbonate. Applicants have found that use of a blend of PCCD and polycarbonate afford a layer with ductility, and increased adhesion between the arylate polyester layer 5 and a compatible resin layer 7 of polycarbonate. The blends of PCCD/PC have excellent clarity, physical and mechanical properties. In one embodiment, the blend comprises about 20 to 100 wt. % PCCD and about 80 to 0 wt. % of the polycarbonate.

Suitable ITR resins comprising resorcinol arylate blocks are known; see for example the descriptions and methods for preparation given in Published Patent Application Nos. EP 1124878 [RD 26354] and WO0069945 [RD 26310]. In one embodiment of a resin comprising resorcinol arylate units, the % of resorcinol arylate is from 10 to 90% and the % of BPA and resorcinol carbonates is from 10 to 90%.

Suitable copolyester carbonates are comprised of aromatic BPA polycarbonate units and aromatic polyester units.

The two-layer laminate is prepared as described, various techniques are employed. In one embodiment, two or more layers of the multilayer article are extruded from separate extruders through separate sheet dies into contact with one another when hot, and then passed through a single sheet of rollers. In another embodiment, the polymer melts of the materials constituting the arylate polyester layer 5, the optional tie-layer or layers, and the compatible resin layer or layers 7, are brought together and into contact with one another through a co-extrusion adapter/feed block and then through a single or multi-manifold die. The adapter/feed block is constructed such that the melts forming the separate layers are deposited as adherent layers on the melt of the center layer. After co-extrusion, the multilayer length of the melt produced can be formed into desired shapes, solid sheets or multi-wall panels, in an extrusion die connected downstream. The melt is then cooled under controlled conditions in known manner by means of calendaring (solid sheet) or vacuum sizing (multi-wall panel) and subsequently cut into lengths. An annealing oven may be optionally provided after sizing or calendaring for the reduction of stresses.

In one embodiment, an extruded arylate polyester layer 5 comprising resorcinol arylate polyester chain members is thermally laminated onto a roll of tie-layer or layers of films using a laminator having heated bottom and top rolls. In another example, the coating layer is adhesively laminated onto a compatible layer 7 using a tie-layer film.

EXAMPLES

The following description will illustrate embodiments of the multilayer articles of the present invention and methods of manufacturing the multilayer articles of the present invention, some examples with reference to the attached drawings. The weatherable coating layer comprises a resorcinol arylate-containing block copolyester-carbonate ("ITR") prepared in a manner similar to Example 65 of Patent Application WO0069945.

Example 1

Figure 8:
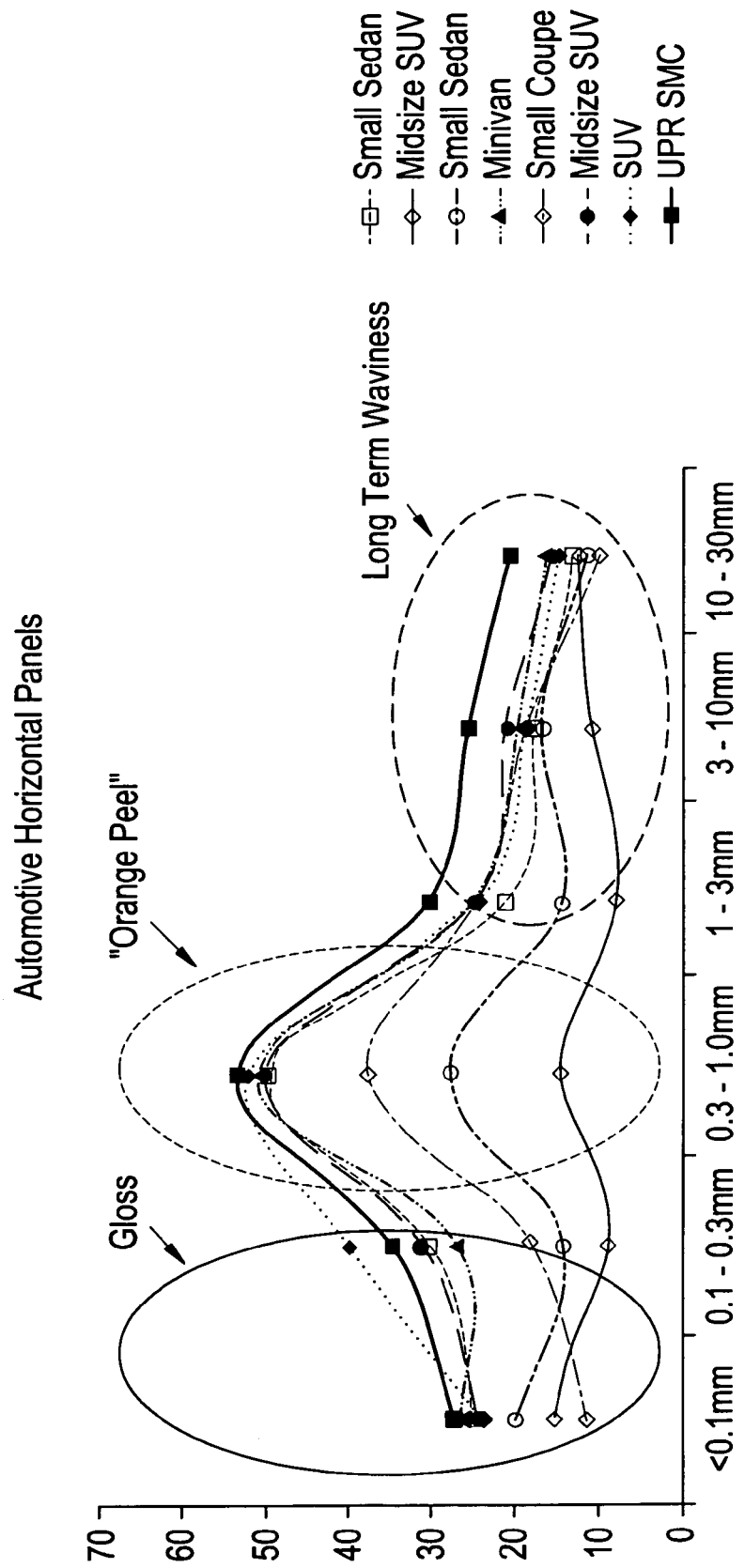
FIG. 8 is a Wavescan for Automotive Horizontal Panels.
Figure 9:
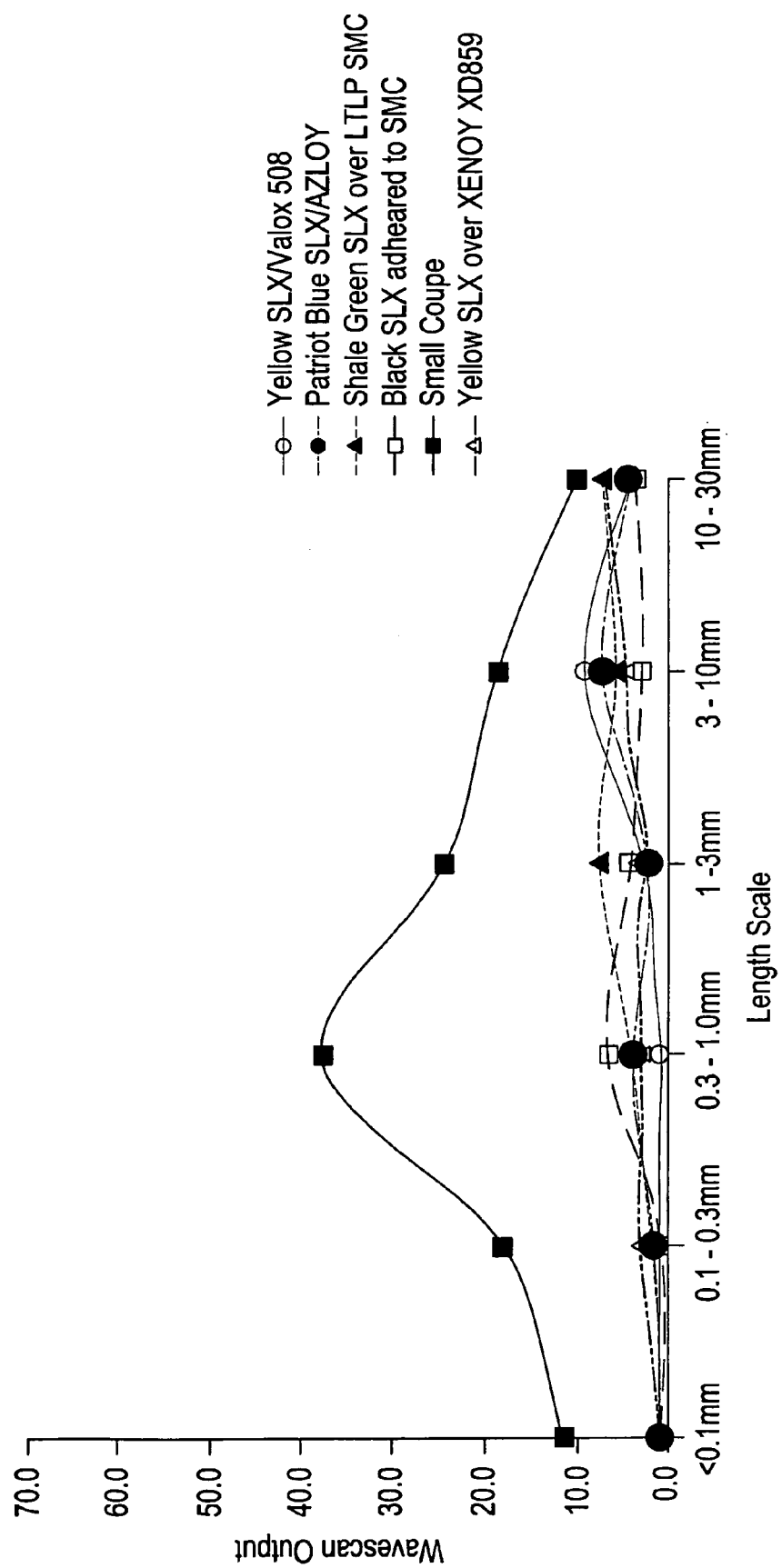
FIG. 9 is a comparison of the Wavescan Output for LEXAN®SLX resin with various reinforced substrates.

FIG. 1 illustrates a cross section of an aesthetic laminate 3 having a clear arylate polyester layer 5 bonded to a compatible resin layer 7 (colored polycarbonate). Laminate 3 is in turn bonded to glass fiber polycarbonate mat material (reinforced resin material 14) by compression molding. The aesthetic laminate 3 may be present on one or both surfaces of the reinforced resin material 14. The thickness of the top aesthetic layer laminate 3 is from about 0.025 to about 2.5 mm with the reinforced fibrous material 14 having a thickness of about 1 to about 8 mm. LEXAN®SLX resin, from General Electric Company, GE Plastics, One Plastics Avenue, Pittsfield Mass., prepared by laminating a LEXAN® polycarbonate compatible resin layer 7 (having a colorant) to an arylate polyester layer 5 to form the polyarylate/polycarbonate laminate 3. The polyarylate/polycarbonate laminate 3 is trimmed and thermoformed to the exterior shape of a "skin" of the final part. The polyarylate/polycarbonate laminate 3 in the form of a shaped skin is then trimmed such that is roughly in the shape of the final part. The skin placed into the upper cavity of the compression tool with the aesthetic side or arylate polyester layer 5 side of the film against the smooth tool surface. A glass fiber containing polycarbonate reinforced resin material 14 mat from Azdel, Inc. is heated in an external oven to between 500 and 700° F. and transferred to the compression tool. The reinforced resin material 14 mat comprises about 30 percent by weight glass fibers having a length of about one half inch in a matrix of polycarbonate. The reinforced resin material 14 mat is substantially fully densified and has a mass per unit area of about 0.8 to 1.5 lbs/ft². The heated glass fiber/polycarbonate reinforced resin material 14 mat is placed against the bottom tool surface. If a balanced structure is desired, i.e. both top and bottom surfaces of the final part having aestheic surface, an additional arylate/polycarbonate laminate 3 may be placed adjacent the bottom mold surface. In this case the glass fiber/polycarbonate reinforced resin material 14 mat may be placed above another polyarylate/polycarbonate laminate 3 in lower mold cavity. In either case, at least one aesthetic Class A surface is created for the final part. This surface has a clear outer arylate polyester layer 5 bonded to an aesthetically colored polycarbonate compatible resin layer 7, which is in turn bonded to the reinforced resin material 14 (glass fiber/polycarbonate mat). Placing the polyarylate/polycarbonate laminate 3 in the upper tool cavity permits separately controlling the temperature of the laminate 3 and the hot glass fiber/polycarbonate reinforced resin material 14 mat during closure of the tool and compression molding. The laminate 3 is maintained at about the softening point to minimize glass fiber read through and other surface imperfections. The tool is closed at which time the arylate/polycarbonate laminate 3 comes in contact with the preheated the glass fiber/polycarbonate reinforced resin material 14 mat. A pressure of about 500 and 5000 psi is applied. The glass fiber/polycarbonate reinforced resin material 14 mat material flows to fill the cavity and is subsequently cooled. The compression mold 12 is opened and the structural part is removed. Any masking present is removed for the final part. The measurement device for surface characterization is the BYK Gardner Wavescan machine (detailed in Brister, E. et al. "Zero VOC SOLLX Film for Weatherable, high-gloss, Chemical and Scratch Resistant Performance," proceedings of the 29$^{th}$ International Waterborne, high-solids, & powder Coatings February 2002, 261–275.) Wavescan measures reflection of light images in the <1 mm to 30 mm length range with lower values corresponding to better surfaces. FIG. 8 shows Wavescan benchmarks for Automotive Horizontal panels. Lower Values correspond to better surfaces. The three-circled regimes correspond to three areas of surface appearance of Gloss, Orange Peel, and long-term waviness. The dark orange curve (with the label UPR SMC) is painted SMC and provides a surface quality benchmark for the weatherable films with identified as LEXAN®SLX type resin on the graph. Wavescan results of in-mold LEXAN®LX resin over fiberglass polycarbonate reinforced resin material 14 mat is included in FIG. 5 along with LEXAN®SLX resin film over other reinforced surfaces. Painted UPR SMC is included as a benchmark. "LTLP SMC" corresponds to Low pressure, Low Temperature SMC. VALOX® 508 resin is a glass reinforced PC/PBT alloy sold by GE Plastics and ZZLOY is a Glass Mat Thermoplastic GMT) made by AZDEL Inc. The surface quality of LEXAN®SLX/LEXAN® laminate 3 is better than corresponding painted parts.

As an even more specific example, a polycarbonate/glass fiber reinforced resin material 14 mat, 30 percent by weight chopped glass fiber, and 70 percent by weight polycarbonate having a density in g/cm³ of 1.44 is compression molded at a temperature of 620° F. and a pressure of 4000 psi with a LEXAN®SLX/LEXAN® laminate 3 having a arylate polyester layer 5 adjacent a polycarbonate compatible resin layer 7. The aesthetic laminate 3 has a thickness of about 0.05 inch and the fiber AZDEL GMAT reinforced resin material 14 mat has a thickness of about 0.16 inch. Prior to compression molding, a Teflon strip is inserted between the aesthetic laminate 3 and the glass reinforced resin material 14 mat along one edge. After compression molding, the resulting composite is cut into strips 1 inch by 6 to 8 inches with a the laminate 3 and the glass reinforced resin material 14 mat being separated by the Teflon strip at one of the ends. The adhesion of the aesthetic laminate 3 to the reinforced resin material 14 mat is measured by a 90-degree peel test with a 200 lb and a load cell at a peel rate of 1 inch per minute. To start the peel, the laminate 3 is separated from the reinforced resin material 14 mat in the area of the Teflon strip. The grips from the testing machine are attached to the respective laminate 3 and reinforced resin material 14.

TABLE 1

| Substrate | Conversion Process | Av. Peel Strength (lb/in) | Standard Deviation |
| --- | --- | --- | --- |
| SMG "class-A" | Compression Molding | 3.8 | 1.46 |
| VALOX 508 (glass filled Engineering Thermoplastic) | Injection Molding | 8.9 | 2.0 |

TABLE 1-continued

| Substrate | Conversion Process | Av. Peel Strength (lb/in) | Standard Deviation |
| --- | --- | --- | --- |
| AZLOY | Compression Molding | 29.4 | 9.7 |

Table 1 sets forth the peel strength of LEXAN®SLX/LEXAN® laminate 3 attached to various reinforced resin material 14. The peel strength of the aesthetic laminate and glass AZLOY mat material had a peel strength higher than the SMC or glass filed Valox material.

According to one example, the compression molding was done by heating the nominal 30% glass content chopped fiber AZLOY GMT (~4000 GSM) reinforced resin material 14 to 600 F in an infrared oven and compression molding it with Lexan®SLX laminate 3. The Lexan®SLX laminate 3 sheets used were typically the 30 mil or 50 mil sheets. The ITR surface was positioned next to the chromed Class-A tool surface. The forming was done in a square tool measuring 150 sq. inches with shear edges. The press used was a four post Lawton press with a tonnage of 500 tons. The press was closed at speeds between 45 and 75 inches per minute. The closure height was about 6 inches.

What is claimed is:

1. A process for forming a shaped composite article, comprising;
   thermoforming a layered material into a desired shape, wherein said layered material comprises a layer of an arylate polyester layer and a compatible resin layer;
   inserting said thermoformed material into a first mold half;
   heating a resin material to form a heated resin;
   disposing said heated resin material onto a second mold half of the open mold; and,
   compression molding said thermoformed material to said heated resin material by bringing said first mold half and said second mold half together to compress said heated reinforced resin material together with said thermoformed material.

2. A process for forming a shaped composite article according to claim 1 wherein the arylate polyester layer is clear and the compatible resin layer comprises a colorant.

3. A process for forming a shaped composite article according to claim 1, wherein said compatible resin layer is selected from the group consisting of an aromatic polycarbonate resin, a polyester resin, and mixtures comprising at least one of the foregoing.

4. A process for forming a shaped composite article according to claim 1, wherein composite article has an outer layer of the clear arylate polyester polymer.

5. A process for forming a shaped composite article according to claim 1, wherein said compatible resin layer is adherent to both said arylate polyester layer and said resin material.

6. A process for forming a shaped composite article according to claim 1, comprising a balancing layer positioned adjacent said resin material on the side of said resin material opposite said thermoformed material.

7. A process for forming a shaped composite article according to claim 1, wherein said thermoformed material is inserted into a first mold half so that said arylate polyester layer is in physical contact with said first mold half.

8. A process for forming a shaped composite article according to claim 1, wherein said heated resin material does not contact said thermoformed laminate while the mold is in an open position.

9. A process for forming a shaped composite article according to claim 1, wherein heating the resin material and disposing said heated resin material onto a second mold half comprises extruding the resin material onto the second mold half.

10. A process for forming a shaped composite article according to claim 1, wherein the first mold half and the second mold half are brought together at a force of 500 psi to 5,000 psi.

11. A process for forming a shaped composite article according to claim 1, wherein the resin material further comprises fibers.

12. A process for forming a shaped composite article, comprising;

thermoforming a layered material into a desired shape, wherein said layered material comprises a layer of an arylate polyester layer and a compatible resin layer;

inserting said thermoformed material into a first mold half;

heating a resin material to form a heated resin;

disposing said heated resin material onto a second mold half of the open mold; and, compression molding said thermoformed material to said heated resin material by bringing said first mold half and said second mold half together under pressure to compress said heated reinforced resin material together with said thermoformed material to form the composite article with an outer surface comprising the arylate polyester layer.

* * * * *